United States Patent Office
3,414,389
Patented Dec. 3, 1968

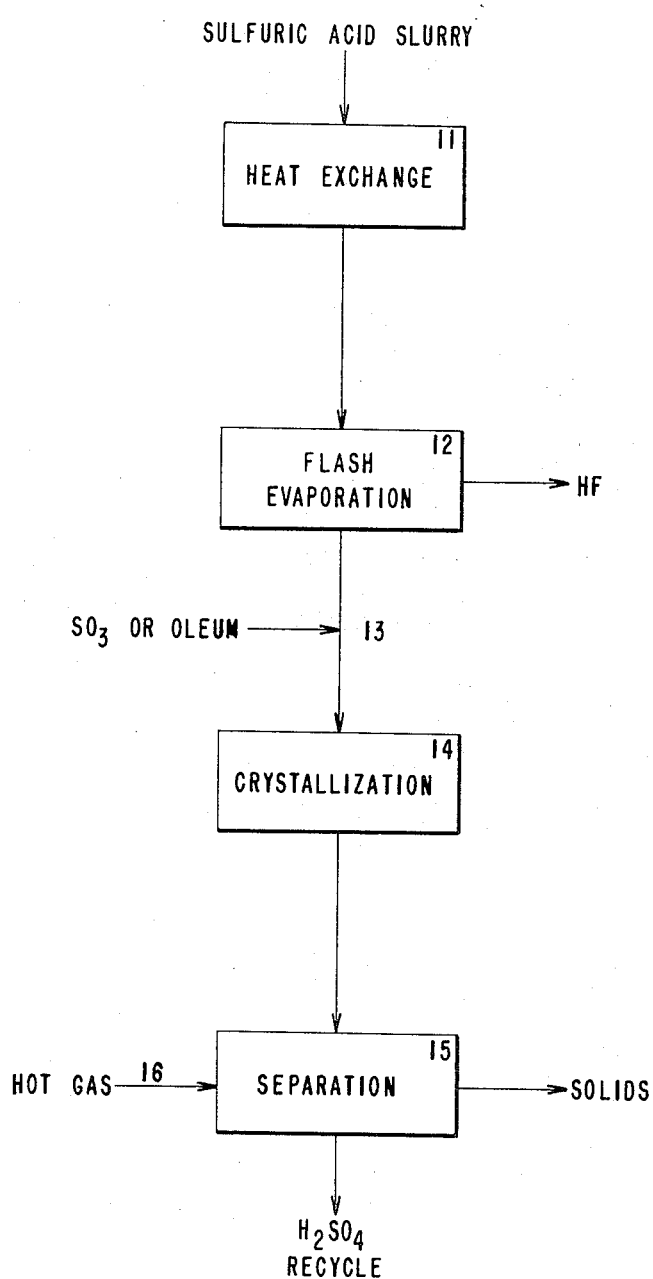

3,414,389
REMOVAL OF CALCIUM SULFATE SOLIDS FROM SULFURIC ACID SLURRIES
William H. Ehlig, Baytown, Tex., and Thomas P. Turnbull, Memphis, Tenn., assignors to E. I. du Pont de Nemours and Company, Wilmington, Del., a corporation of Delaware
Filed Feb. 9, 1965, Ser. No. 431,268
7 Claims. (Cl. 23—304)

ABSTRACT OF THE DISCLOSURE

By-product calcium sulfate solids present in sulfuric acid slurries employed in processes for producing hydrogen fluoride can be efficiently removed therefrom by controlling the composition of the slurry such that the total fluoride content expressed as hydrogen fluoride does not exceed 2% by weight and the water content does not exceed 10% by weight, maintaining the slurry at a temperature not exceeding 125° C. until crystallization of the solids occurs and separating the crystals thus formed by filtration, centrifugation or other physical means.

---

The present invention relates to the production of hydrogen fluoride and is more particularly directed to a method for the removal of by-product calcium sulfate solids from a sulfuric acid slurry employed in a process for producing hydrogen fluoride.

It is well known that the production of HF by reaction of a metal fluoride in a slurry of excess liquid sulfuric acid has not ben commercially feasible because of the lack of a satisfactory method of separating the by-product metal sulfate from the excess sulfuric acid.

Furthermore, it is well known that in the commercial production of hydrogen fluoride wherein a metal fluoride such as an alkali or alkaline earth metal fluoride is contacted with sulfuric acid in a reactor that the hydrogen fluoride bearing product gas stream removed from the reactor contains appreciable amounts of solids, i.e., metal sulfate and metal fluoride solids, in very fine particulate state. A convenient means for removing these solids, commonly referred to as "dust," is by scrubbing the gas stream with concentrated sulfuric acid. This scrubbing with acid also is effective in removing other contaminants present in very small amounts in the HF product gas stream such as water vapor, fluosulfonic acid vapor, and sulfuric acid vapor. A particularly desirable dust scrubbing scheme is disclosed and claimed in copending application S.N. 428,916, filed Jan. 29, 1965, which issued as U.S. Patent 3,347,022, assigned to our assignee.

The sulfuric acid employed either as the reaction medium or as the scrubbing agent soon is converted to a viscous slurry as the concentration of solids increases. As the solids content of this acid increases the viscosity of the slurry increases until it is no longer useful for a reaction medium. When used as a scrubbing medium the increasing viscosity eventually leads to a pluggage of the lines and openings in the scrubbing system. To avoid solids buildup beyond the point of operability in either system, the acid slurry must be purged from time to time and replaced with fresh sulfuric acid.

It is, of course, highly desirable from economic considerations and waste diposal considerations to be able to readily treat this purged acid slurry for the removal of the solids present and recycle the separated acid to the hydrogen fluoride process. Attempts to use low cost conventional filtering techniques for this purpose have generally been unsuccesful in the past because the solids are too fine and as a result cause filter blinding or bleedthrough in the filtrate.

In accordance with the present invention, an improved method is provided for the removal of calcium sulfate solids from an HF and sulfuric acid slurry employed in an HF process which involves adjusting the composition of the acid slurry to insure that the total fluoride content therein does not exceed 2% by weight and that the water content therein does not exceed 10% by weight, allowing the resulting acid slurry to stand at a temperature not exceeding about 125° C. in order for crystallization to occur, and separating the solids from the acid slurry by physical means. Surprisingly, it is found that by controlling the HF content and the water content of the acid slurry in the manner described above, crystals are obtained in the crystallization step, conducted at temperatures below about 125° C., of a particle size well suited to permit removal of the solids from the acid by standard techniques, such as by filtration, centrifugation, or decantation. Preferably the temperature for the crystallization step will be maintained in the range of from 60 to 120° C. although lower temperatures can be employed if desired. It is preferable that the water content of the sulfuric acid slurry be maintained within a range of from about 2 to 7% by weight.

In the recrystallization process, a portion of the liquid acid phase is complexed within the crystals formed. This complex crystal can be decomposed, and a major portion of the liquid acid recovered by heating the solids remaining after initial acid recovery to above 100° C. by standard techniques such as passing a hot gas such as air through the filter or centrifuge cakes. Temperatures above about 140° C. are preferred.

The term "sulfuric acid slurry" used herein means an acid stream purged from an HF scrubbing operation or from a sulfuric acid slurry type HF reactor which is predominately sulfuric acid on a solids-free basis. This sulfuric acid slurry contains appreciable amounts of calcium sulfate solids, fluosulfonic acid, water, and hydrogen fluoride and in addition contains small amounts of various process derived contaminates or by-products such as silicon tetrafluoride and sulfur.

It is found that the choice of analytical techniques for determining scrubber acid composition is quite important. This is because there exists in the liquid system containing HF and sulfuric acid an equilibrium as described by the following equation:

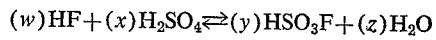

where $w$, $x$, $y$, and $z$ are molar quantities of the respective compounds and analytical techniques which destroy or combine any of the compounds during analysis tend to change the equilibrium composition of the sample being analyzed. With due regard to the foregoing consideration, the analysis of sulfuric acid slurry compositions as reported herein are obtained by the following methods of analysis and calculated as indicated below. The percentages by weight given for fluosulfonic acid, non-volatile acid, sulfuric acid, hydrogen fluoride, and water herein and in the claims are on a solids-free basis:

(a) Fluosulfonic acid content is determined by first neutralizing a sample of sulfuric acid slurry with ice cold dilute sodium hydroxide to prevent the hydrolysis of $SO_3F$ ion, adjusted to pH 5.0, and free $SO_4$ precipitated by adding $BaCl_2$. After filtration the filtrate is made acidic with HCl and boiled to effect hydrolysis of the fluosulfonate ion according to the reaction

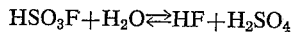

The sulfate formed during this hydrolysis is precipitated as $BaSO_4$, is filtered, weighed, and calculated as $HSO_3F$ and it taken as $y$ in the equation above.

(b) Non-volatile acid content is determined by first adding to a sample of sulfuric acid slurry concentrated HCl and water to hydrolyze all $HSO_3F$ to HF and $H_2SO_4$. The hydrolyzed sample is evaporated over a steam bath to drive off the HF. The residual acidity which is equivalent to both the $H_2SO_4$ and $HSO_3F$ of the sample is titrated with standard sodium hydroxide to a phenolphthalein end point. The titer is calculated as $H_2SO_4$ and is taken as $x+y$ equivalent mols of $H_2SO_4$.

(c) The water content is determined by titration of a sample of sulfuric acid slurry with Karl Fischer reagent to the potentiometric dead stop end point. The titer is calculated as $H_2O$ and is taken as the quantity $z$ in the equation above.

(d) The total fluoride content expressed as hydrogen fluoride is determined by first separating fluoride from a sample of sulfuric acid slurry as fluosilicic acid by use of a conventional Willard-Winter distillation. The distillate is titrated with standard thorium nitrate solution to a pink colored thorium alizarin lake end point. The titer is calculated as total fluoride content expressed as hydrogen fluoride.

(e) The percent solids content is determined by first evaporating a weighed sample of sulfuric acid slurry to dryness and then igniting it at 600 to 700° C. The residue after ignition is weighed and calculated as precent by weight solids.

A better understanding of the method of the invention will be gained from the following description taken together with the accompanying patent drawing which is a flow diagram illustrating the preferred mode of operation of the invention.

Referring now to the drawing, sulfuric acid slurry purged either from an HF scrubbing operation or from a sulfuric acid slurry HF reactor is charged to the method of the invention for removal of by-product solids. The temperature of the sulfuric acid slurry as purged from a sulfuric acid slurry type HF reactor generally is in a range of about 120° C. to the normal boiling point of sulfuric acid. The temperature of the sulfuric acid slurry as purged from a HF scrubbing operation generally is in a range of from about 120 to 150° C.

When the temperature of the slurry is above 125° C., the HF concentration of above 2% by weight and/or the water concentration above about 4% by weight the slurry is passed through heat exchange step 11 prior to being fed to flash evaporation step 12. Sufficient heat is removed from the sulfuric acid slurry by heat exchange so that the slurry leaving the flash evaporator will be below 125° C. after adding sulfur trioxide or oleum as discussed below.

The flash evaporator is controlled so that the HF content in the HF lean acid slurry leaving the evaporator does not exceed about 2% by weight. Some water will also be flashed off reducing the amount of oleum or $SO_3$ addition later. Of course, if the HF content is already below 2% by weight as it is purged from the scrubbing or reaction system, flash evaporation step 12 of the process may be eliminated.

If the water content of the acid slurry stream following HF removal in the flash evaporator is above about 7% by weight, it may be conveniently brought into the desired range for the invention by $SO_3$ or oleum addition 13. The water content in the acid slurry can vary depending upon the temperature at which crystallization is conducted. At the maximum temperature suitable for crystallization, namely, about 125° C., the water content is preferably maintained below about 5% by weight. As the temperature of the crystallization step is decreased, the water content of the acid may be increased, but a content above about 10% should be avoided. For rapid crystallization purposes it is preferred that the water content of the acid be maintained in a range of from 2 to 7% by weight.

Following the adjustment of water content and HF content within the specified limits for the purpose of the invention, the HF and water lean acid slurry is charged to crystallization step 14. In this step of the process, the HF and water lean acid slurry is maintained at a temperature below 125° C. for a sufficient time for crystallization to occur. Although the temperature for crystallization may vary widely below 125° C. it is usually preferable to maintain the temperature for this step of the process within the range of from about 60 to 120° C. Within this temperature range crystallization will occur within a time of from about 20 minutes to 2 or 3 hours.

After crystallization is substantially complete, the sulfuric acid slurry is transported to separation step 15. It is found that the crystals are formed of such a size in accordance with the method of the invention that the solids may be separated from the HF and water lean sulfuric acid slurry by standard techniques. This can be accomplished by merely permitting the solids to settle and decanting the liquid acid. It is preferable, however, to use conventional filtration techniques, but, if desired, centrifugation may also be employed.

The solids cake produced by filtration or centrifugation may contain up to 60% by weight sulfuric acid. A portion of this sulfuric acid is complexed within the solid crystals and the remainder is on the surface of the crystals. To effect a more complete recovery, hot gas may be passed through the cake. At gas temperatures above about 100° C. the crystals begin to break down releasing the sulfuric acid complexed within the crystal. For example undried air at 210° C. from line 16 is passed through the bed for a period of less than 20 minutes. The crystals break down releasing the complexed sulfuric acid leaving a bed of fine particle size solids which contain as little as 0.6% by weight sulfuric acid. Steam can be used in place of air with similar results. Of course, the sulfuric acid can also be removed by heating the complex sufficiently to vaporize the acid from it followed by recovery of the acid through condensation.

The sulfuric acid thus recovered from the separation step 15 may be conveniently recycled to the HF process.

The following examples further illustrate the removal of by-product solids from sulfuric acid slurry according to the present invention. All percentages are in weight percent unless otherwise noted.

Example 1

Utilizing the flow scheme illustrated in the patent drawing, 100 pounds per hour of sulfuric acid slurry at a temperature of 135° C. and composition: 89.0% non-volatile acid as $H_2SO_4$, 16.0% $HSO_3F$, 5.6% total fluoride, and 7.3% $H_2O$ and containing 30% calcium sulfate reactor residue, is charged to a flash evaporator maintained at a pressure of 2 pounds per square inch absolute. The HF lean acid slurry removed from the evaporator is at a temperature of 120° C. and has a total fluoride content of 1% and a water content of 3%. The average hold time of the HF lean acid slurry is one hour at a temperature in a range of 110 to 120° C. to permit crystallization to proceed to substantial completion.

The HF and water lean acid slurry from the crystallizer is then fed to a continuous rotary filter.

While on the filter undried air at 210° C. is passed through the cake for 20 minutes. A satisfactory filter cake is formed. The filtrate removed contains only 3.5% calcium sulfate, essentially all of which is in solution. The filtrate acid having a sulfuric acid content of 96% is suitable for recycle to the HF process.

The calcium sulfate discharged contains 0.51% sulfuric acid.

Example 2

493 parts of 97% sulfuric acid is charged to a stainless steel beaker and heated to 116° C. After adding 44 parts of calcium fluoride of a commercial acid grade fluorspar, the charge is stirred with an agitator and further heated to 140° C. The charge is held at a temperature of 140° C. for 2½ hours with the HF product formed being permitted to evolve from the beaker. Starting after one hour at 140° C. photomicrographs of samples taken at ½ hour intervals from the beaker show the particle size of the solids to be similar in appearance and size to particles of calcium sulfate obtained as dust found in an HF product gas from a typical commercial scale HF reactor.

The charge is then cooled to 122° C. in 17 minutes and a photomicrograph of a sample taken from the charge at this point shows about 5% of the solids are converted to crystal plates 30 to 60 microns in size. In the next 15 minutes the sample is cooled to 110° C. and a photomicrograph of a sample removed at this point shows about 50% of the solids are converted to crystal plates 100 to 150 microns in size. In the next 23 minute period following, the charge is held between 104 and 120° C. During this period the solids settled to the bottom of the agitated beaker. A photomicrograph of a sample taken at the end of this period shows that conversion to 100–200 micron crystal plates is essentially complete. The charge is held for another 55 minute period and a photomicrograph of the sample removed at the end of this period shows further crystal growth and a partial change from the plate to a rod shape. A sample of the liquid phase taken just prior to the last 55 minute holding period analyzed 0.2% total fluoride content expressed as HF. Cold air is passed through these crystals for one hour and the cake formed is then washed with isopropyl ether and air is then again applied for 2 hours. The crystals at the end of this treatment analyze $CaSO_4 \cdot 0.59 H_2SO_4$ suggesting the crystal composition of $CaSO_4 \cdot \frac{1}{2} H_2SO_4$. Crystals removed from the charge by filtration at the conclusion of the last holding period are blown with cold air for one hour and analyzed. These crystals analyze $CaSO_4 \cdot 0.775 H_2SO_4$.

Example 3

79 parts of finely ground calcium sulfate reactor residue, having an analysis of 0.8% $H_2O$, 0.4% HF, 3.6% $H_2SO_4$, 93.7% $CaSO_4$, 0.6% $CaF_2$, and 0.4% $Fe_2(SO_4)_3$, and 520 parts of 97.3% sulfuric acid are charged to a vacuum crystallizer. The charge, which is typical of a sulfuric acid slurry purged either from an HF scrubbing operation or from a sulfuric acid slurry type HF reactor, is stirred and heated to 100° C. in a period of 40 minutes. To saturate the charge with HF gaseous anhydrous hydrofluoric acid technical is bubbled through the charge in the vacuum crystallizer over the next 33 minute period during which the charge is heated to 140° C. Analysis of the charge after saturation is: 92.4% non-volatile acid as $H_2SO_4$, 18.2% $HSO_3F$, 4.0% total fluoride, and 6.6% $H_2O$ and containing 9.6% calcium as calcium sulfate. The flow of gaseous HF is stopped and the heating mantle turned off. The pressure in the vacuum crystallizer is reduced to about 1.5 pounds per square inch absolute for the next 7 minutes, cooling the charge from 142° C. to 124° C. The pressure in the vacuum crystallizer is raised to atmospheric and the charge is sampled. Analysis of this sample is: 95.4% non-volatile acid as $H_2SO_4$, 3.6% $HSO_3F$, 0.7% total fluoride, and 4.5% $H_2O$ and containing 12.4% calcium as calcium sulfate. The charge is held at atmospheric pressure and 124° C. for 17 minutes. A photomicrograph taken at the end of this period shows complete conversion of the solids to plate crystals 30 to 60 microns in size. Aging the charge at 124° C. and atmospheric pressure gives minor improvement in crystal size.

The charge is then fed to a continuous rotary filter. A satisfactory cake is formed and the filtrate is suitable for use as make-up sulfuric acid in an HF process.

Since many different embodiments of the invention may be made without departing from the spirit and scope thereof, it is to be understood that the invention is not limited by the specific illustrations hereinabove set forth except to the extent defined in the following claims.

We claim:

1. A process for removing calcium sulfate solids from a sulfuric acid slurry thereof containing hydrogen fluoride comprising controlling the composition of said slurry such that the total fluoride content expressed as hydrogen fluoride does not exceed 2% by weight and the water content does not exceed 10% by weight, maintaining said slurry at a temperature not exceeding 125° C. for a time sufficient for crystallization of said solids to occur and separating the crystals thus formed by physical means, said composition of said slurry being controlled by flash evaporating hydrogen fluoride therefrom and subsequent thereto adding an anhydride of the group consisting of sulfur trioxide and oleum to reduce the water content.

2. The process of claim 1 wherein said water content is maintained in the range of from 2% to 7% by weight.

3. The process of claim 1 wherein said slurry is maintained at a temperature of from about 60 to about 120° C.

4. The process of claim 1 wherein said water content is maintained in the range of from 2% to 7% by weight and said slurry is maintained at a temperature of from about 60 to about 120° C.

5. The process of claim 1 wherein the crystals separated from said slurry are heated to a temperature of at least about 100° C., thereby effecting release of sulfuric acid complexed with said separated crystals.

6. The process of claim 1 wherein said crystals are heated by contacting therewith a gas stream maintained at a temperature of at least about 100° C.

7. The process of claim 1 wherein said gas is undried air.

References Cited

UNITED STATES PATENTS

| | | | |
|---|---|---|---|
| 2,316,343 | 4/1943 | Kubelka | 23—122 |
| 2,434,040 | 1/1948 | Hartman | 23—153 |
| 2,655,430 | 10/1953 | Schcermeier | 23—122 |
| 2,846,290 | 8/1958 | Yacoe | 23—153 |
| 2,952,334 | 9/1960 | Provoost | 23—153 |
| 3,160,473 | 12/1964 | Hayworth | 23—153 |
| 3,199,952 | 8/1965 | Zanon | 23—153 |
| 3,207,579 | 9/1965 | Burkhardt | 23—153 |

NORMAN YUDKOFF, *Primary Examiner.*

G. P. HINES, *Assistant Examiner.*